United States Patent [19]

Echigo et al.

[11] 4,444,554
[45] Apr. 24, 1984

[54] HEATING METHOD AND APPARATUS

[75] Inventors: Ryozo Echigo, Tokyo; Takaaki Noda, Aichi, both of Japan

[73] Assignee: Daidotokushuko Kabushikikaisha, Japan

[21] Appl. No.: 377,874

[22] Filed: May 13, 1982

[30] Foreign Application Priority Data

May 13, 1981 [JP] Japan ............................. 56-72483

[51] Int. Cl.$^3$ .................. F27D 17/00; F27B 9/00; F24H 1/00
[52] U.S. Cl. ......................... 432/28; 165/DIG. 6; 432/148; 432/219
[58] Field of Search ............ 432/28, 29, 148, 219, 432/223; 165/DIG. 6

[56] References Cited

U.S. PATENT DOCUMENTS 1,603,631 10/1926 Munhollon ........................... 432/29
1,748,136 2/1930 Lipsius ................................ 432/148
2,672,618 9/1956 Johnson et al. ..................... 432/148
3,564,648 2/1971 Snow ................................... 432/148

Primary Examiner—John J. Camby
Attorney, Agent, or Firm—William A. Drucker

[57] ABSTRACT

Method and apparatus for heating materials such as metal rods whereby hot combustion gases are blown against the material and allowed to pass through a gas-permeable partition located inside the heating apparatus so that the partition is heated to radiate a great amount of heat into the apparatus, further increasing the temperature of atmosphere in the apparatus heated by the hot combustion gases so as to accelerate the heating of the material. After the combustion gases have thus passed through the partition, heat is further transferred from the gases to a recuperator means located inside the apparatus so that the gases are then allowed to discharge into a flue under lowered temperatures.

7 Claims, 6 Drawing Figures

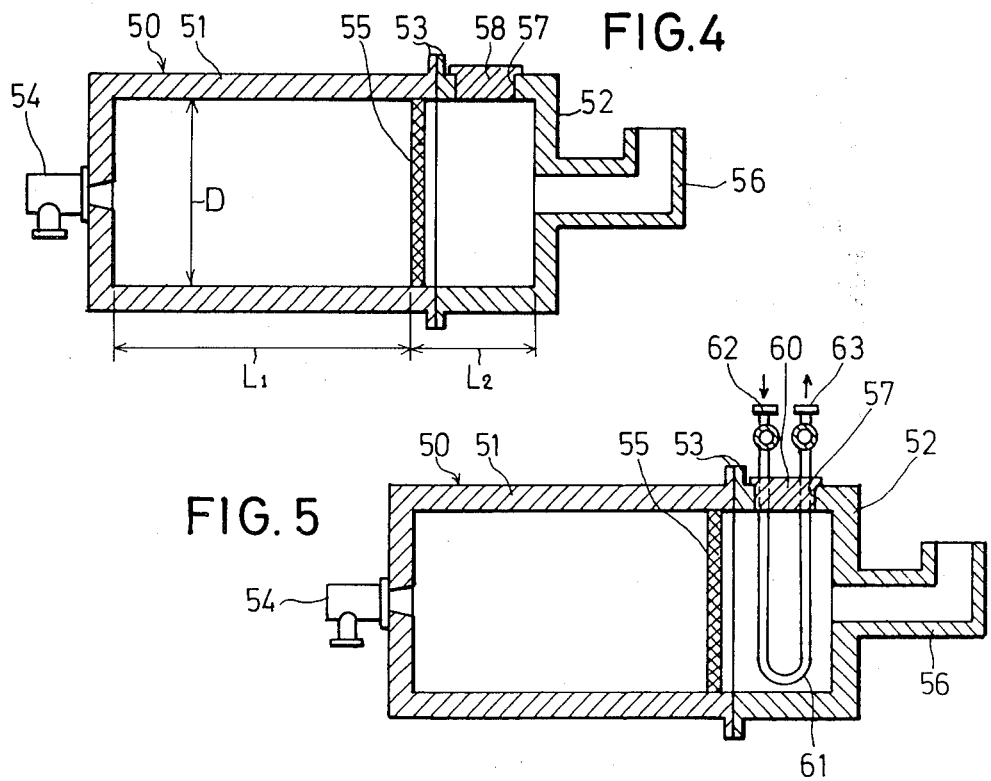
FIG. 4
FIG. 5
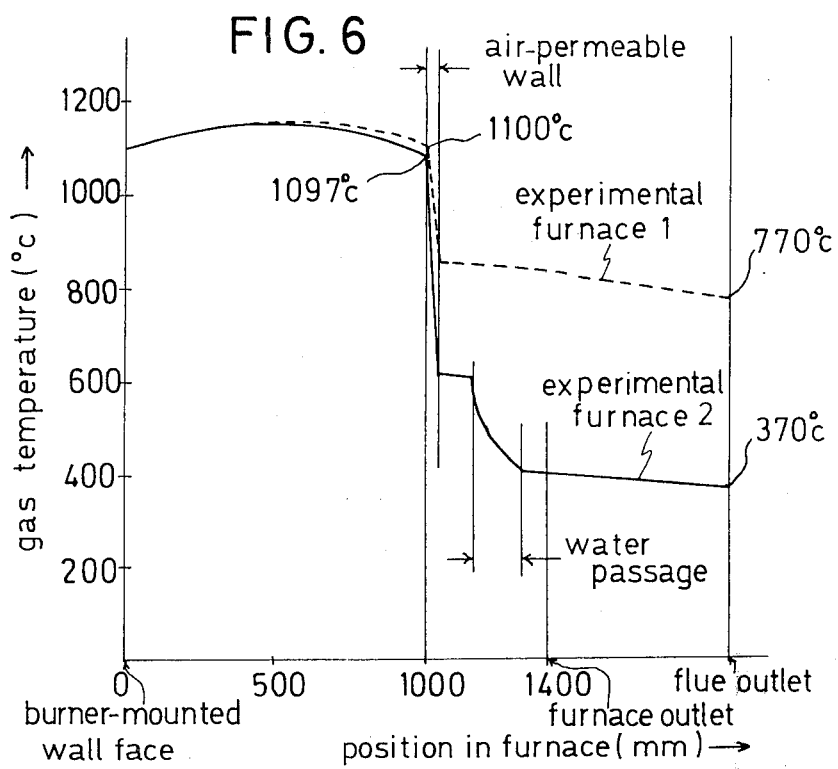
FIG. 6

4,444,554

HEATING METHOD AND APPARATUS

BACKGROUND OF THE INVENTION

1. Field of the Invention

This invention relates to methods and apparatus for heating metal or other material by high-temperature gas in a furnace, and particularly relates to heating methods and apparatus whereby heat energy contained in high-temperature gas used for heating a material is recovered when the gas is discharged.

2. Description of the Prior Art

In the prior art, when heat is to be recovered from gas used for heating a material and discharged from the heating furnace, the gas discharged from the furnace is introduced through a flue into a recuperator located separate from the furnace. Some of the prior inventors, however, have proposed that a heat exchanger be located along the inner surface of a heating furnace instead of a recuperator being disposed separate from the furnace, because by so doing the heat recovery from exhaust gas may be made with no equipment provided outside the furnace and no additional cost therefor and with no heat loss of the exhaust gas flowing through the flue connecting the furnace to the external recuperator. However, such a proposal is not a satisfactory solution because the heat exchanger disposed inside the furnace absorbs heat, lowering the temperature in the furnace so that inadequate heating of the material may result.

SUMMARY OF THE INVENTION

An object of the invention is to provide a method and apparatus for heating metal or other material by using high-temperature gas in a furnace.

Another object of the invention is to provide a method and apparatus for heating metal or other material in a furnace by using radiant heat in addition to high-temperature gas. That is, according to the invention, when high-temperature gas used for heating a material is discharged from the furnace, a portion of the heat energy contained in the gas is converted into radiant heat which is then radiated inside the furnace so as to increase the thermal efficiency in the furnace.

A further object of the invention is to provide a heating method and apparatus whereby the recovery of a certain amount of heat energy, as radiant heat, from high-temperature gas used for heating a material is followed by a further recovery of additional amount of heat energy from the same gas by a recuperator.

A still another object of the invention is to provide a heating method and apparatus which allow a recuperator to be located in a dead space within a heating furnace so that the cost of whole equipment may be saved.

A still further object of the invention is to provide a heating method and apparatus whereby the heating space in a furnace is maintained at a high temperature for heating materials, not affected or decreased in temperature by a recuperator located inside the furnace.

Other objects and advantages of the invention will become apparent during the following discussion of the accompanying drawings.

BRIEF DESCRIPTION OF THE DRAWINGS

FIGS. 4 and 5 are a vertical cross section of experimental heating furnace according to the invention.

FIG. 6 is a graph showing the results of experiments made by the inventor.

DESCRIPTION OF THE PREFERRED EMBODIMENTS

Figure 1:
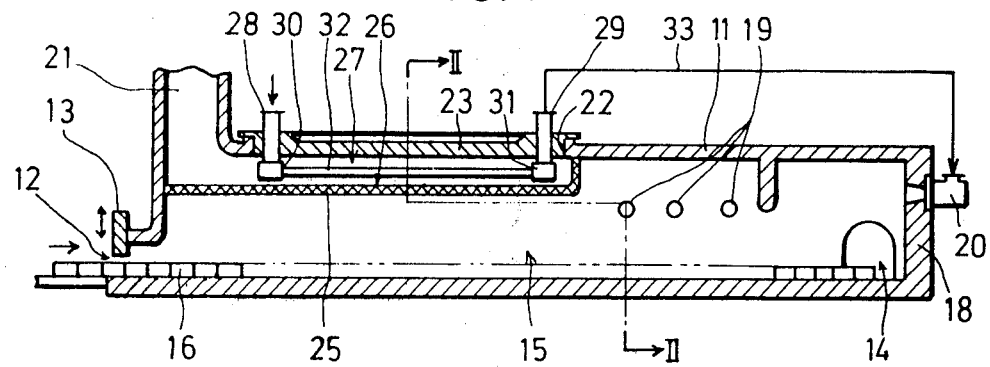
FIG. 1 is a vertical cross section of a pusher-type heating furnace according to the invention.
Figure 2:
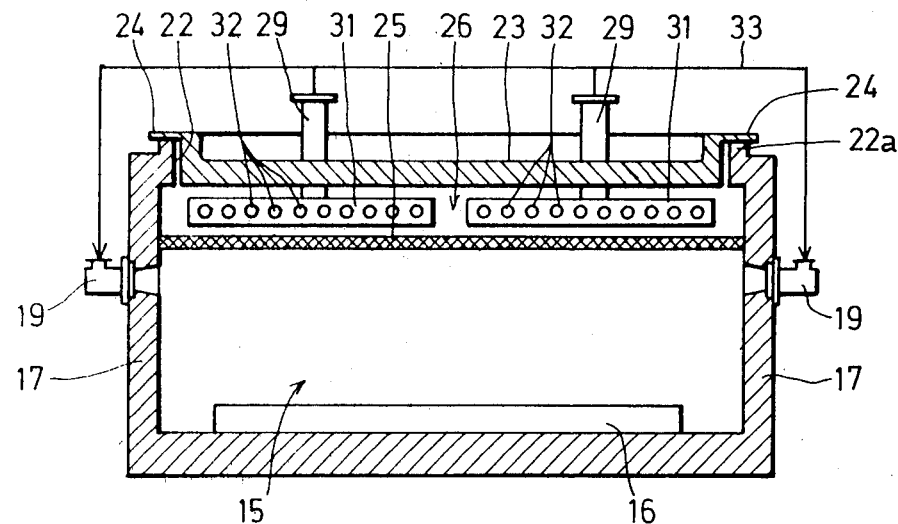
FIG. 2 is a cross section of the furnace of FIG. 1 taken on the line II—II.

Referring to FIGS. 1 and 2, a pusher-type heating furnace 11 includes, as is well known in the art, an outer wall of such material as steel plates and an inner wall of such materials as refractory and heat-insulating materials disposed in layers which confine a heating chamber 15 as a major chamber in the furnace 11. The furnace 11 is provided, at one end thereof, with a material-introducing port 12 which is opened or closed by operating a door 3. At the other end, the furnace 11 is also provided with a material-discharge port 14 which is opened or closed by operating a door (not shown). Outside the furnace 11, a material-inserting mechanism well known in the art is provided in proximity to the introduction port 12. An auxiliary material-conveyance mechanism such as skid rails or truck is located in the furnace 11.

A pair of high-temperature gas supply devices 19 such as burners are attached to opposite side walls 17 of the furnace 11, and another identical gas-supply device 20 is also attached to a side wall 18 of the furnace 11. A flue 21 is connected to and opened into the furnace 11 at the forward end of the top of the furnace 11. The top of the furnace 11 is not made continuously, but broken on the left-hand side (in FIG. 1) to provide an opening 22 in which a removable lid means 23 is located with a pair of projecting edges 24 resting on supports or tops 22a of the side walls 17. The opening 22 is completely closed by the lid means 23 and its projecting edges 24.

Inside the furnace 11, an air-permeable partition 25 is connected to the front wall, side walls 17, and top of the furnace by means of crosspieces or the like, and divides the whole space in the furnace 11 into the heating chamber 15 and a heat-exchanging chamber 26 which communicates the flue 21. The partition 25 is constructed of seven stainless-steel wire nets (of 0.6 mm. in wire diameter and of 16 meshes) connected to one another in layers to a thickness of 8.4 mm. Any other suitable number of stainless-steel wire nets than seven may be used, however, to make up the partition 25. Also, the wire nets as the material of partition 25 may be of other suitable metal than stainless steel; moreover, the partition 25 may be made of other heat-resistant material than metal, such as ceramic material. Furthermore, the partition 25 may be of any suitable construction such as wire netting, honeycomb-like shape, fibrous or porous structure.

The heat-exchanging chamber 26 includes a recuperator 27 comprising a pair of air-introducing pipes 28 and a pair of heated-air supply pipes 29 which are located opposite to each other. The opposite pipes 28 and 29 are provided with headers 30 and 31, respectively, at lower ends thereof, and each pair of opposite pipes 28 and 29 are connected to each other by means of a plurality of air passages 32 connecting each pair of opposite headers 30 and 31. The air-introducing pipes 28 are connected to such means as air blower (not shown), while the heated-air supply pipes 29 are connected to the burners 19 and 20 through a duct line 33.

In the foregoing construction, air is supplied from the air blower to the recuperator 27, heated therein, and further supplied to the burners 19 and 20 through the duct line 33. At the same time, the burners 19 and 20 are supplied with fluid fuel and burns the fuel to produce hot combustion gases. The combustion gases (with, for example, an average temperature of 950° C.) flow into the material-heating chamber 15 and also enter the heat-exchanging chamber 26 through the air-permeable partition 25, heating the partition 25 to a higher temperature (with the lower side of the partition 25 being heated to a higher temperature than the upper side thereof), so that the partition 25 radiates a great amount of heat into the heating chamber 15. Having thus heated the partition 25, the combustion gases are lowered in temperature (to, for example, 750° C.), and in the heat-exchanging chamber 26 a certain amount of heat is transferred from the combustion gases to the air flowing through the passages 32 so that the gases are further reduced in temperature (to, for example, 450° C.), while the air flowing through the passages 32 is heated (to, for example, 370° C.). The gases thus cooled are then discharged through the flue 21. It is to be noted here that the flue 21 may have a longer service life because of lowered temperatures of the gases flowing therethrough.

In the heating mechanism thus operated, materials 16 such as metal rods are successively inserted into the heating chamber 15 and heated not only by the hot combustion gases produced by the burners 19 and 20, but also by the heat radiated from the air-permeable partion 25, so that the material is given a desired higher temperature while being conveyed through the furnace 11. The material thus heated is then allowed to come from the furnace 11 through the discharge port 14.

The existence of the recuperator 27, through which normal-temperature air from the air blower flows, in the furnace 11 has no adverse effect upon the heat treatment of the material 16 because the air- or gas-permeable partition 25 not only separates the recuperator 27 from the heating chamber 15, but also radiates a great amount of heat into the chamber 15.

The air heated in the recuperator 27 by the hot combustion gases may be supplied not only to the burners 19 and 20, but to those of other equipment (not shown). Also, steam instead of hot air may be produced in the recuperator 27 by supplying water (instead of air) into the recuperator and heating the water by the hot combustion gases. The steam thus produced may be supplied not only to the burners 19 and 20, but for such purposes as air conditioning in a room.

Figure 3:
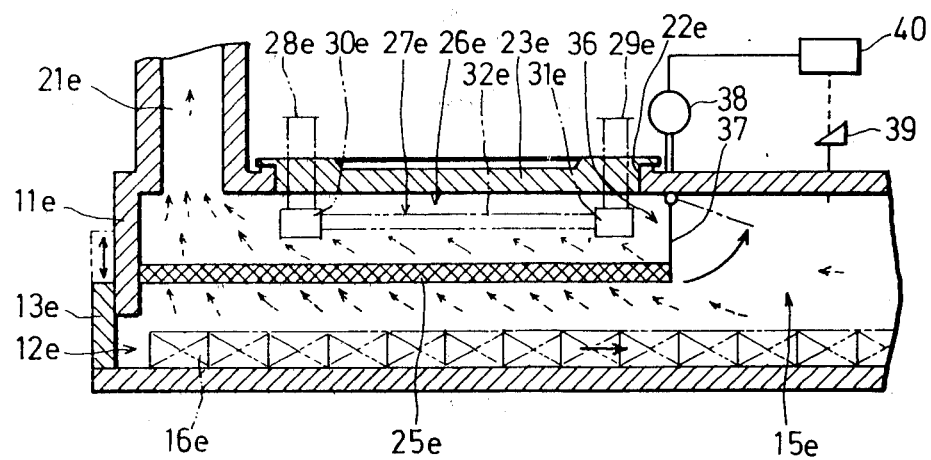
FIG. 3 is a partial view of another embodiment of heating furnace according to the invention.

Referring to FIG. 3, another embodiment of heating mechanism may be constructed by making rotatable or openable a portion 37 of a vertical section of an air-permeable partition 25e so as to provide a by-pass inlet 36. In this construction the rotatable portion or damper 37 of the partition 25e is opened or closed by a motor 38 located outside a furnace 11e. Also outside the furnace 11e, such a means as thermoelectric couple 39 is connected to the top of the furnace 11e for detecting the temperature in a heating chamber 15e. A monitor switch 40 is connected to the temperature-detecting means 39 for controlling the operation of the motor 38.

In such a construction the damper 37 may be opened in a desired amount within an angle of 90 degrees so as to allow a desired amount (although in a certain range) of the hot combustion gases flowing in the heating chamber 15e to enter a heat-exchanging chamber 26e without passing through the partition wall 25e, but directly from the by-pass inlet 36, while the other portion of the combustion gases enters the chamber 26e through the partition 25e, heating the partition 25e. Therefore, in this construction, the amount of heat radiated from the partition 25e into the heating chamber 15e is controlled by opening the damper 37 at a desired angle. The adjustment of the amount of radiant heat from the partition 25e is made according to the rate of successive supply of materials (to be heat-treated) into the furnace and/or variation of the temperature in the heating chamber 15e, so that the materials are heated to desired temperatures. Where the opening angle of the damper 37 is to be adjusted according to variations of the temperature in the heating chamber, it is a desired practice to set the monitor switch 40 in advance so that a desired functional relationship is established between the temperature detected by the temperature detector 39 and the operation of the motor 38 to open or close the damper 37. With the monitor switch 40 thus set, the opening angle of the damper 37 is automatically adjusted according to the temperature in the chamber 15e.

In the second embodiment of heating mechanism of FIG. 3, sections exactly or substantially identical to those of the first embodiment of FIGS. 1 and 2 are designated by the same numerals as of those of the first one and the letter e attached thereto.

The inventor herein has made experiments, by using furnaces of FIGS. 4 and 5, in order to display one of the major advantages of the invention that the hot combustion gases in the heating chamber are not lowered in temperature for all practical purposes by such a means as recuperator located in the heating furnace. The furnaces of FIGS. 4 and 5 are exactly the same except that the furnace of FIG. 5 is provided with a water passage 61 which is a counterpart of the recuperator 27 of FIGS. 1 and 2. Each experimental furnace 50 of FIGS. 4 and 5 comprises a furnace body 51 and rear section 52 connected to each other by means of projecting edges 53 formed on both body 51 and section 52. The furnace body 51 is provided with a burner 54 at one end thereof and with an air-permeable partition 55 at its other end. A flue 56 is connected to and opened into the rear section 52. The rear section 52 includes an opening 57 blocked up by a lid means 58 in the first experimental furnace of FIG. 4, although by a lid means 60 having the foregoing water passage 61 in the second experimental furnace of FIG. 5. The water passage 61 includes an inlet 62 connected to a cooling-water supply source (not shown) and an outlet 63 connected to a discharge pipe (not shown).

The furnace 50 is of such an inner dimension that the inside diameter D is 600 mm., the distance $L_1$ from the inner surface of the front or burner-mounted wall to the front surface of the air-permeable partition 55 is 1,000 mm., and the distance $L_2$ from the front surface of the partition 55 to the inner surface of the rear wall is 400 mm. The partition wall 55 is constructed of seven circular stainless-steel wire nets (of 0.6 mm. in wire diameter and of 16 meshes) connected to one another in layers to a thickness of approximately 9 mm.

In the experiments by the inventor, butane was burned by the burner 54 at a rate of 40,000 kilocalories per hour in each experimental furnace and the butane gases were allowed to flow into the furnace body 51, enter the rear section 52 through the partition wall 55, and discharge into the flue 56, while the temperatures of the gases in the furnace were measured as shown in FIG. 6.

As is clearly displayed in FIG. 6, the hot combustion gases in the second experimental furnace of FIG. 5 were lowered in temperature to a greater degree, i.e., 370° C., when reaching the outlet of the flue 56 projecting from the furnace, compared with the temperature of the gases in the first experimental furnace of FIG. 4 lowered to 770° C. in the same place in the flue 56. Needless to say, this great difference in lowered temperatures was due to the fact that the combustion gases in the furnace of FIG. 5, after reduction in temperature effected by passing through the partition wall 55, were further deprived of heat by water flowing through the cooling pipe 61 in the rear section 52 of the furnace. However, immediately before passing through the partition 55, the combustion gases in the furnace of FIG. 5 at all times were at almost the same temperature as the gases in the furnace of FIG. 4 in the same place thereof, or had a temperature of 1,097° C. compared with 1,100° C. in the furnace of FIG. 4, with only a very slight difference of 3° C. between the two. It is also to be noted that the combustion gases flowing through the furnace body 51 of FIG. 4 and that of FIG. 5 had practically the same temperature distribution. That is, the combustion gases flowing through the furnace body 51 were not reduced in temperature for all practical purposes by those in the rear section 52 already lowered in temperature to a considerable degree.

Another experiment was also made by using the same fuel as in the foregoing in the furnace of FIG. 1, but from which the rear section 52 had been completely removed from the furnace. The result is that the combustion gases flowing through the furnace have had practically the same temperature distribution as those flowing through the body 51 of the furnace of FIG. 5.

From the results of experiments thus made, the following conclusion may be reached: When the space in the heat-treatment furnace is divided by an air- or gas-permeable partition means of the foregoing material and construction into a heating chamber and another chamber with a different function or purpose, the heating chamber may be thermally insulated for all practical purposes from the other chamber by the heat-insulating properties of the partition means, if the thermal conditions in the latter chamber are subjected to any variations.

As many widely different embodiments of the invention may be made without departing from the spirit and scope thereof, it is to be understood that the invention is not limited to the specific embodiments hereinbefore described except as defined in the appended claims.

What is claimed is:

1. A method for heating materials such as metal rods comprising the steps of supplying high-temperature gases into a heating furnace, heating the material by the gases in a heating chamber of the furnace, and discharging the gases used for heating into a flue connected to and opened into the furnace, the gas-discharge step including the sub-steps of:
   (a) providing a gas-permeable partition having plural gas flow passages for allowing gases to flow from one side of said partition to the other side thereof,
   (b) bending said gas flow passages,
   (c) providing a flue, a space between said partition and said flue, and a recuperator in said space,
   (d) passing the gases through said gas-permeable partition separating said flue from said heating chamber of the furnace;
   (e) allowing the gases having passed through said partion to enter said space between said partition and flue; and
   (f) allowing the gases having entered said space to come into said flue.

2. A heating method in accordance with claim 1 wherein said step of supplying high-temperature gases into the furnace comprises burning fluid fuel to produce hot combustion gases while supplying air heated by and in said recuperator for said burning of the fluid fuel.

3. A heating method in accordance with claim 1 or 2 wherein said step of discharging the gases into the flue further includes a sub-step of allowing a portion of the gases used for heating the material to pass through a completely opened by-pass, instead of passing through said gas-permeable partition, to enter said space between said partition and flue.

4. An apparatus for heating materials such as metal rods comprising:
   (a) a hollow furnace body adapted to allow the material to be heated to be removably located therein,
   (b) means connected to said furnace body for supplying hot combustion gases into said furnace body, and
   (c) a flue connected to and opened into said furnace body for discharging the hot combustion gases used for heating the material, said furnace body including
   (d) a gas-permeable partition which divides the space in said furnace body into a material-heating chamber and a heat-exchanging chamber in such a manner that said heat-exchanging chamber communicates with said flue, and the hot combustion gases used for heating the material pass through said gas-permeable partition before discharging into said flue, and
   (e) said gas-permeable partition having plural bent gas flow passages for allowing gases to flow from one side of said partition to the other side thereof, the bend being determined so that heat rays cannot be passed from one side of the partition to the other side thereof.

5. A heating apparatus in accordance with claim 4 wherein said heat-exchanging chamber includes a recuperator means.

6. A heating apparatus in accordance with claim 5 wherein said means for supplying hot combustion gases are burners to produce hot combustion gases by burning fluid fuel, said burners being connected to said recuperator means so that air heated in said recuperator means is supplied to said burners.

7. A heating apparatus in accordance with claim 4, 5, or 6 wherein said gas-permeable partition includes a damper means which is adapted to provide a by-pass port for allowing a portion of the hot combustion gases used for heating the material to directly enter said heat-exchanging chamber and discharge into said flue without passing through said gas-permeable partition.

* * * * *